(12) United States Patent
Deng

(10) Patent No.: US 12,204,973 B2
(45) Date of Patent: Jan. 21, 2025

(54) SMART LABEL BASED ON NFC, HAT, AND MANUFACTURING METHOD OF SMART LABEL BASED ON NFC

(71) Applicant: SHENZHEN ZAMFUN GARMENT ACCESSORIES CO., LTD., Shenzhen (CN)

(72) Inventor: Qian Deng, Shenzhen (CN)

(73) Assignee: SHENZHEN ZAMFUN GARMENT ACCESSORIES CO., LTD., Shenzhen (CN)

( * ) Notice: Subject to any disclaimer, the term of this patent is extended or adjusted under 35 U.S.C. 154(b) by 97 days.

(21) Appl. No.: 18/133,530

(22) Filed: Apr. 12, 2023

(65) Prior Publication Data
US 2024/0127024 A1    Apr. 18, 2024

(30) Foreign Application Priority Data
Oct. 18, 2022   (CN) .......................... 202211271489.7

(51) Int. Cl.
*G06K 19/077* (2006.01)
*H04B 5/72* (2024.01)

(52) U.S. Cl.
CPC . *G06K 19/07758* (2013.01); *G06K 19/07722* (2013.01); *H04B 5/72* (2024.01)

(58) Field of Classification Search
CPC ....... G06K 19/07758; G06K 19/07722; G06K 19/00; H04B 5/72
USPC .......................................... 23/488, 487, 380
See application file for complete search history.

(56) References Cited

U.S. PATENT DOCUMENTS

2017/0344864 A1* 11/2017 Forster ............. G06K 19/07786

\* cited by examiner

*Primary Examiner* — Edwyn Labaze

(57) ABSTRACT

The present disclosure provides a smart label based on NFC, a hat, and a manufacturing method of the smart label. The smart label includes an NFC chip storing product information, a fixing layer fixing the NFC chip, a first recycled material layer disposed on the fixing layer, a first silicone layer, a second recycled material layer disposed on the fixing layer, a second silicone layer, and a wrapping layer. The product information is obtained by an electronic device having an NFC function. The wrapping layer is wrapped around an outer periphery of a structure. The structure is formed by the first silicone layer, the first recycled material layer, the fixing layer, the second recycled material layer, and the second silicone layer. By providing the NFC chip in the smart label, when the electronic device is communicated with the smart label on the hat, the product information is read.

14 Claims, 4 Drawing Sheets

SMART LABEL BASED ON NFC, HAT, AND MANUFACTURING METHOD OF SMART LABEL BASED ON NFC

TECHNICAL FIELD

The present disclosure relates to a technical field of near field communication (NFC), and in particular to a smart label based on NFC, a hat, and a manufacturing method of the smart label based on NFC.

BACKGROUND

In order to increase diversity of hats, ready-made clothes, bags, small gifts, and other products in the market, merchants usually make a specific trademark/logo into a label, such as a patch. The patch is then bonded to a product by a hook-and-loop fastener, which is favored by the majority of consumers.

However, a conventional label has a single structure, which is generally a basic fabric layer. A pattern, such as the logo, is printed or sewn on the basic fabric layer. The conventional label cannot be attributed or customized to the greatest extent by the customers, and a degree of technology and intelligence of the conventional label is low.

SUMMARY

In view of a problem in the prior art that a conventional label has a low degree of intelligence, the present disclosure provides a smart label based on near field communication (NFC) and a manufacturing method thereof. An electronic device having an NFC function obtains product information corresponding to the smart label through near field communication with the smart label, thereby facilitating obtaining \brand information or advertisement content corresponding to the product.

To achieve the above object, the present disclosure adopts following technical solutions.

In a first aspect, the present disclosure provides the smart label based on NFC. The smart label comprises an NFC chip, a fixing layer, a first recycled material layer, a second recycled material layer, and a wrapping layer.

The NFC chip comprises an NFC coil configured to interact with a mobile terminal and a storage module configured to store product information corresponding to the smart label. The fixing layer is configured to fix the NFC chip.

The first recycled material layer is disposed on an upper surface of the fixing layer. A first silicone layer is disposed on an upper surface of the first recycled material layer.

The second recycled material layer is disposed on a lower surface of the fixing layer. A second silicone layer is disposed on a lower surface of the second recycled material layer.

The wrapping layer is wrapped around an outer periphery of a structure. The structure is formed by the first silicone layer, the first recycled material layer, the fixing layer, the second recycled material layer, and the second silicone layer.

Optionally, a first positioning sheet and a second positioning sheet are bonded together to form the fixing layer. The second positioning sheet is disposed on the first positioning sheet. The NFC chip is disposed between the first positioning sheet and the second positioning sheet.

Optionally, the first positioning sheet and the second positioning sheet are thermoplastic polyurethane (TPU) sheets. The TPU sheets are bonded together by die-casting to form the fixing layer.

Optionally, a middle position of one side of at least one of the first positioning sheet and the second positioning sheet defines a first groove. An opening of the first groove defined on one of the first positioning sheet and the second positioning sheet faces to the other one of the first positioning sheet and the second positioning sheet. The first groove is configured to accommodate the NFC chip.

Optionally, second grooves are defined around the first groove. Magnets are disposed in the second grooves. The magnets have a same magnetic pole direction.

Optionally, the magnets are magnets made of a rare earth permanent magnet material.

Optionally, the first recycled material layer and the second recycled material layer are made of recycled cloth. The first recycled material layer is formed on the upper surface of the fixing layer by printing, curing, and baking. The second recycled material layer is formed on the lower surface of the fixing layer by printing, curing, and baking.

Optionally, the wrapping layer is an embroidered wrapping layer formed by an embroidered wrapping process or a glazed wrapping layer formed by a glazed wrapping process.

In a second aspect, the present disclosure provides the manufacturing method of the smart label based on NFC. The manufacturing method of the smart label comprises S100: providing a fixing layer, and embedding an NFC chip in the fixing layer;

S200: respectively forming a first recycled material layer on an upper surface of the fixing layer and a second recycled material layer on a lower surface of the fixing layer;

S300: forming a first silicone layer on a surface of the first recycled material layer, and forming a second silicone layer on a surface of the second recycled material layer; and S400: forming a wrapping layer around an outer periphery of a structure formed by the first silicone layer, the first recycled material layer, the fixing layer, the second recycled material layer, and the second silicone layer.

Optionally, in a step S100, the fixing layer comprises a first positioning sheet and a second positioning sheet. A step of embedding the NFC chip in the fixing layer comprises:

S101: laying the first positioning sheet; placing the NFC chip on the first positioning sheet, and S102: laying and bonding the second positioning sheet on the first positioning sheet to position the NFC chip between the first positioning sheet and the second positioning sheet.

Optionally, a middle position of one side of at least one of the first positioning sheet and the second positioning sheet defines a first groove. The first groove defined on the one side of one of the first positioning sheet and the second positioning sheet faces to the other one of the first positioning sheet and the second positioning sheet. The first groove is configured to accommodate the NFC chip.

The step of embedding the NFC chip in the fixing layer comprises:

placing the NFC chip in the first groove defined on the at least one of the first positioning sheet and the second positioning sheet; bonding the first positioning sheet and the second positioning sheet.

Optionally, in the step S100, the fixing layer comprises the first positioning sheet and the second positioning sheet. The second positioning sheet is disposed on the first positioning sheet.

A first groove is defined on a middle portion of one side of the first positioning sheet. The one side of the first positioning sheet faces to the second positioning sheet. The first grooves is configured to accommodate the NFC chip. Second grooves are defined around the first groove. The second grooves are configured to accommodate magnets.

Alternatively, first grooves are respectively defined on the middle position of the one side of the first positioning sheet facing the second positioning sheet and a middle position of one side of the second positioning sheet facing the first positioning sheet. The first grooves are configured to accommodate the NFC chip. The second grooves are defined around the first grooves. The second grooves are configured to accommodate magnets.

The step of embedding the NFC chip in the fixing layer comprises:

S101: laying the first positioning sheet with the first one of the first grooves facing upwards; placing the NFC chip in the first one of the first grooves on the first positioning sheet; placing the magnets one-to-one in the second grooves defined on the first positioning sheet;

S102: laying the second positioning sheet on the first positioning sheet and positioning the NFC chip and the magnets between the first positioning sheet and the second positioning sheet; and S103: placing an insulating thermal insulation pad on a position, corresponding to the NFC chip, of the surface of the fixing layer; die-casting and bonding the first positioning sheet and the second positioning sheet at a temperature of 190-210° C.

Optionally, in a step S300, the first silicone layer is formed on an upper surface of the first recycled material layer by a printing process and a curing and baking process. The second silicone layer is formed on a lower surface of the second recycled material layer by the printing process and the curing and baking process. A curing and baking temperature of the first silicone layer and the second silicone layer is 90-110° C.

Optionally, in a step S400, the wrapping layer is formed on the outer periphery of the structure by an embroidered wrapping process or a glazed wrapping process. When the glazed wrapping process is adopted, a curing and baking temperature of the wrapping layer is 90-110° C.

In a third aspect, the present disclosure provides a hat. The hat comprises a hat body and the smart label mentioned above. A first bonding portion is disposed on the hat. A second bonding portion is disposed on an outer surface of the first silicone layer or an outer surface of the second silicone layer. The first bonding portion and the second bonding portion are bonded together through a hook-and-loop fastener.

Optionally, magnetic portions are disposed on the first bonding portion. The magnetic portions are attracted to the smart label including the magnets.

Since the NFC chip is built in the smart label, the product information corresponding to the smart label is written into the NFC chip in advance. When the smart label is communicated with the electronic device having the NFC function, product information stored in the NFC chip is sent to the electronic device, so that a user is able to conveniently inquire the product information corresponding to the smart label, thereby obtaining the product information.

The NFC chip is effective protected by the first silicone layer, the first recycled material layer, the fixing layer, the second recycled material layer, the second silicone layer and the wrapping layer, so the NFC chip is prevented from entering water, which prolongs service life of the NFC chip.

The smart label is formed by die-casting under high temperature, so the smart label is cold and heat resistant (24-120° C.), and a corresponding clothing or a corresponding hat, where the smart label is attached to, also meets a high-temperature water washing requirement of 60° C. The smart label has multiple ways to wear, is able to adapt to different storage environments, and is not affected by harsh environments.

Figure 1:
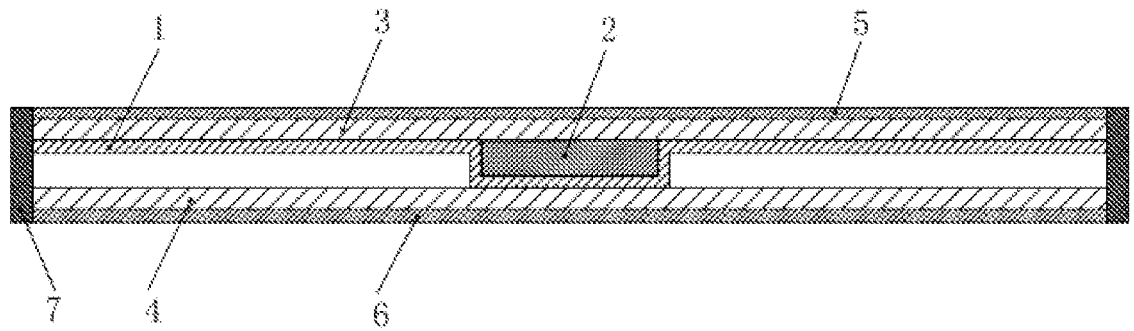
FIG. 1 is a cross-sectional schematic diagram of a smart label based on NFC according to a first embodiment of the present disclosure.

In the Drawings:
1—fixing layer, 11—first positioning sheet, 11a—first groove, 11b—second groove, 12—second positioning sheet, 2—NFC chip, 3—first recycled material layer, 4—second recycled material layer, 5—first silicone layer, 6—second silicone layer, 7—wrapping layer, 8—magnet.

DETAILED DESCRIPTION

In order to facilitate understanding of those skilled in the art, the present disclosure is further described below in connection with the embodiments and accompanying drawings. Details of the embodiments are not intended to limit the present disclosure.

As shown in FIG. 1, the present disclosure provides a smart label based on near field communication (NFC). The smart label comprises a fixing layer 1. An NFC chip 2 is fixedly disposed on the fixing layer 1. The NFC chip 2 comprises an NFC coil configured to interact with a mobile terminal and a storage module configured to store product information corresponding to the smart label. The product information or link information is written into the NFC chip 2 in advance. When the mobile terminal having an NFC function interacts with the smart label in the near field, the mobile terminal is able to obtain the product information or the link information.

The mobile terminal is a cell phone a watch, tablet, or other electronic devices having the NFC function.

In order to ensure use safety of the NFC chip and expand a use environment of smart label, a first recycled material layer 3 is disposed on an upper surface of the fixing layer 1. A first silicone layer 5 is printed on an upper surface of the first recycled material layer 3.

Similarly, a second recycled material layer 4 is disposed on a lower surface of the fixing layer 1. A second silicone layer 6 is printed on a lower surface of the second recycled material layer 4.

One of the first silicone layer 5 and the second silicone layer 6 is made into a 3D silicone layer (e.g., a trademark pattern, a character, etc. is formed on the 3D silicone layer). The 3D layer is displayed outwards relative to a product where the smart label is attached to. The other one of the first silicone layer 5 and the second silicone layer 6 is bonded to the product such as a hat by a hook-and-loop fastener.

The first silicone layer 5, the first recycled material layer 3, the fixing layer 1, the second recycled material layer 4, and the second silicone layer 6 are disposed from top to bottom to form a structure containing the NFC chip 2. A wrapping layer 7 is wrapped around an outer periphery of the structure. Therefore, protective layers are formed around the NFC chip 2, and a waterproof effect of the NFC chip 2 is achieved.

Figure 2:
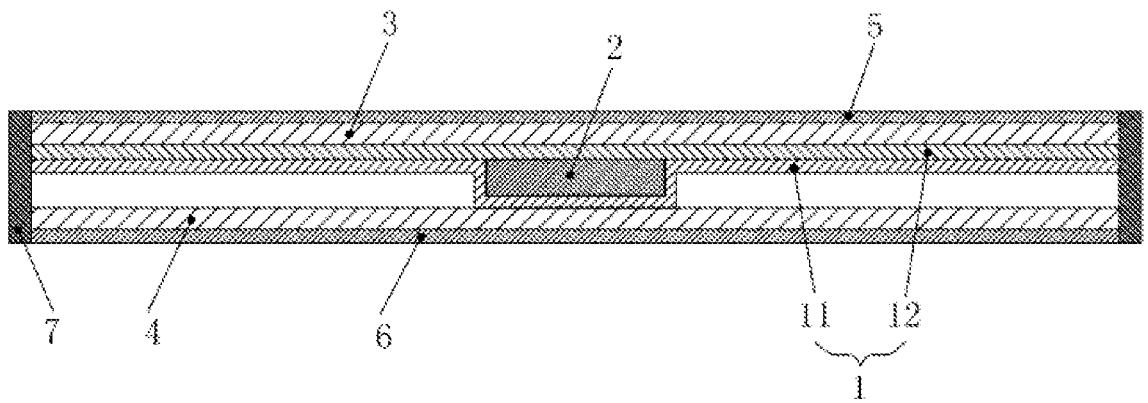
FIG. 2 is a cross-sectional schematic diagram of the smart label based on NFC according to a second embodiment of the present disclosure.

As shown in FIG. 2, a first positioning sheet 11 and a second positioning sheet 12 are bonded together to form the fixing layer 1. The second positioning sheet 12 is disposed on the first positioning sheet 11. The NFC chip 2 is disposed between the first positioning sheet 11 and the second positioning sheet 12.

In one optional embodiment, the first positioning sheet 11 and the second positioning sheet 12 are thermoplastic polyurethane (TPU) sheets. After the NFC chip 2 is disposed between the first positioning sheet 11 and the second positioning sheet 12, the two TPU sheets are die-cast and bonded together under a high temperature conditions (190-210° C.) through ultrasonic waves.

Figure 3:
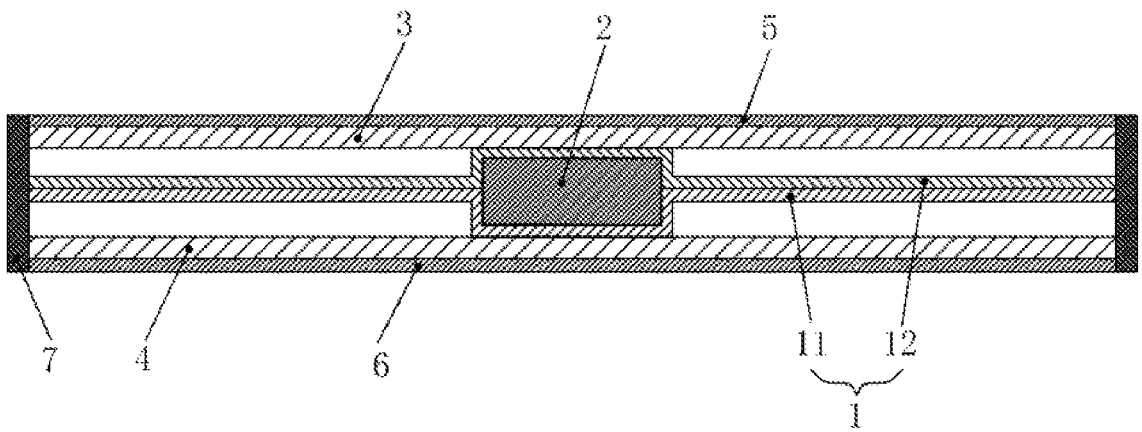
FIG. 3 is a cross-sectional schematic diagram of the smart label based on NFC according to a third embodiment of the present disclosure.

In another embodiment, as shown in FIG. 2, in order to well position the NFC chip 2 between the first positioning sheet 11 and the second positioning sheet 12, a first groove 11a is defined on the first positioning sheet 11. Alternatively, as shown in FIG. 3, first grooves 11a are respectively defined on one side of the first positioning sheet 11 opposite to the second positioning sheet 12 and one side of the second positioning sheet 12 opposite to the first positioning sheet 11. The first grooves 11a are optionally defined on a middle position of the first positioning sheet 11 and a middle position of the second positioning sheet 12. In the embodiment, the smart label is as that shown in FIG. 2. Namely, the first groove 11a is formed on the one side of the first positioning sheet 11 facing the product that the smart label is attached to. A size of the first groove 11a satisfies that when the NFC chip 2 is placed in the first groove 11a, a surface of the first positioning sheet 11 is basically aligned with a surface of the NFC chip 2. Specifically, there is no obvious bumpiness when the first positioning sheet 11 is touched. In the embodiment, there is no first groove defined on the second positioning sheet 12.

When the first positioning sheet 11 and the second positioning sheet 12 are TPU sheets, second grooves 11b are defined around a first one of the first grooves 11a and a second one of the first grooves. The first one of the first grooves 11a is defined on the first positioning sheet 11. The second one of the first grooves 11a is defined on the second positioning sheet 12. The second grooves 11b are configured to accommodate magnets 8.

Figure 4:
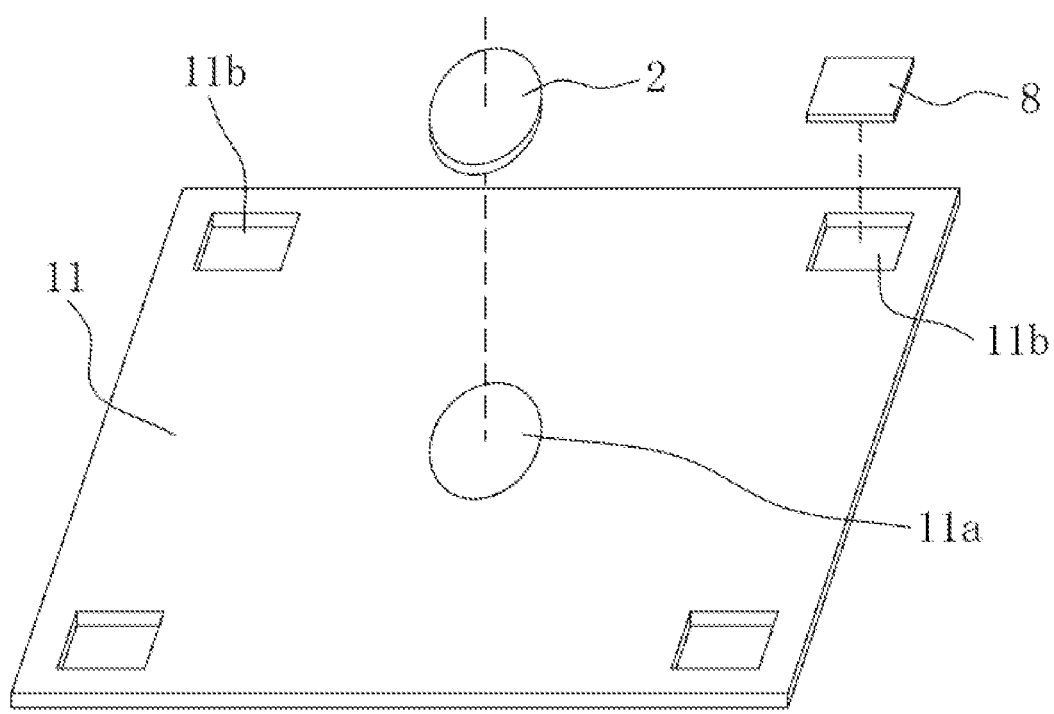
FIG. 4 is a schematic diagram of a first positioning sheet according to one embodiment of the present disclosure where the first positioning sheet is square.

As shown in FIG. 4, which shows the first positioning sheet 11 defining the first groove 11a and the second grooves 11b, the first positioning sheet 11 is square. The first groove 11a is defined on the middle position of the positioning sheet 11. Four second grooves 11b configured to accommodate the magnets 8 are defined on four corners of the first positioning sheet 11. The magnets 8 accommodated in the second grooves 11b defined on the first positioning sheet 11 have a same magnetic pole direction, such as an N pole direction.

Optionally, the magnets 8 are made of a rare earth permanent magnet material, which saves costs to a certain extent. For example, the magnets are made of raw materials containing Nd, FeB and Fe. A preparing method of the magnets comprises:

(1) placing the raw materials of a suitable ratio into a medium-frequency induction furnace under a vacuum condition for smelting;

(2) melting the raw materials into molten iron; rapidly throwing out the molten iron to form an alloy sheet; performing hydrogen breaking, crushing, and uniform mixing on the alloy sheet to form alloy powder; die-casting and molding the alloy powder under protection of an inert gas and under a magnetic field environment to form molded structures; and (3) sintering the molded structures in a vacuum sintering furnace and then annealing the molded structures to obtain rare earth permanent magnets of high performance.

Although FIG. 4 shows one embodiment of the first positioning sheet 11 that is square, a shape of the first positioning sheet 11 is not limited thereto, and the shape of the first positioning sheet 11 may be triangular, penlabelram, or other irregular shape with a certain pattern. For example, when the first positioning sheet 11 is a regular triangle structure, the NFC chip 2 is disposed in the first groove 11a defined on the middle position of the first positioning sheet 11, and the second grooves 11b configured to accommodate the magnets 8 are defined on three corners of the regular triangle structure.

For the first positioning sheet 11 of the irregular shape, the NFC chip 2 may be disposed at a substantially middle position of the first positioning sheet 11, and the second grooves 11b are defined around the first grooved 11a on the first positioning sheet 11. The number of the second grooves 11b is determined according to a specific shape of the first positioning sheet 11.

It should be noted that, regardless of structures of the first positioning sheet and the second positioning sheet, when the magnets 8 are placed, there should be a certain safe distance between a position of each of the second grooves 11b and an installation position of the NFC chip 2. The safe distance is at least 10 mm, which on one hand avoids impact of the magnets 8 on work of the NFC chip 2 during near-field interaction, and on the other hand avoids overloading of the NFC chip when the smart label is folded. The impact of the magnets 8 on the work of the NFC chip 2 and the overloading of the NFC chip 2 are likely to lead to frequency interruption of the NFC chip 2.

Of course, a distance between the first grooves 11a and each of the second grooves 11b on the first positioning sheet 11 needs to be strictly calculated, and the minimum distance is related to the interaction between the magnets and the NFC coil in the NFC chip.

In one embodiment, the first recycled material layer and the second recycled material layer are made of recycled cloth of high density, which has functions of cold-resistant and waterproof to a certain extent. The first silicone layer 5 and the second silicone layer 6 are made of environmentally friendly materials. Specifically, the environmentally friendly materials are corresponding materials selected by the GRS international certification.

Optionally, the wrapping layer 7 is made of the recycled cloth of high density and is an embroidered wrapping layer formed by an embroidered wrapping process or a glazed wrapping layer formed by a glazed wrapping process. When the glazed wrapping process is adopted, a curing and baking process is performed to from the glazed wrapping layer.

Figure 5:
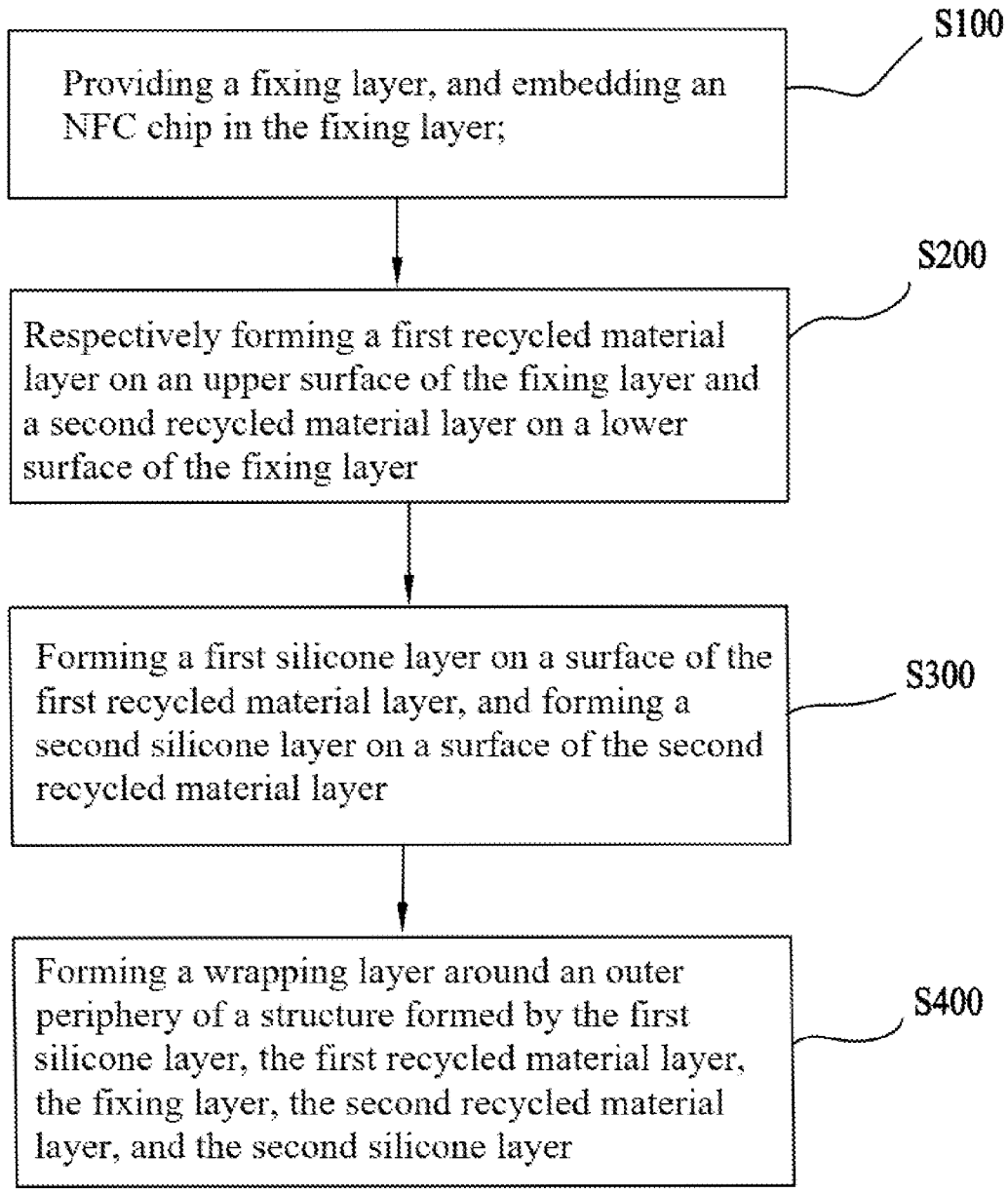
FIG. 5 is a flow chart of a manufacturing method of the smart label.

As shown in FIG. 5, the present disclosure provides a manufacturing method of the smart label based on NFC. The manufacturing method of the smart label comprises S100: providing the fixing layer 1, and embedding the NFC chip 2 in the fixing layer 1;

When the fixing layer 1 is of a single-layer structure, the NFC chip 2 is directly embedded in a groove formed on the fixing layer 1.

When the fixing layer 1 comprises the first positioning sheet and the second positioning sheet, the NFC chip 2 is fixed between the first positioning sheet 11 and the second positioning sheet 12.

In order to well fix the NFC chip 2, the first groove 11 configured to accommodate the NFC chip 2 is defined on the first positioning pieces 11.

When the first positioning sheet 11 and the second positioning sheet 12 are the TPU sheets, the second grooves 11b configured to accommodate the magnets 8 are defined on the first positioning piece 11 where the first groove 11a is located. The second grooves 11b thereof are distributed at an appropriate distance around the first groove 11a thereof to avoid the frequency interruption caused by magnetic induction and the overloading of the NFC chip 2 when the smart label is folded.

Figure 6:
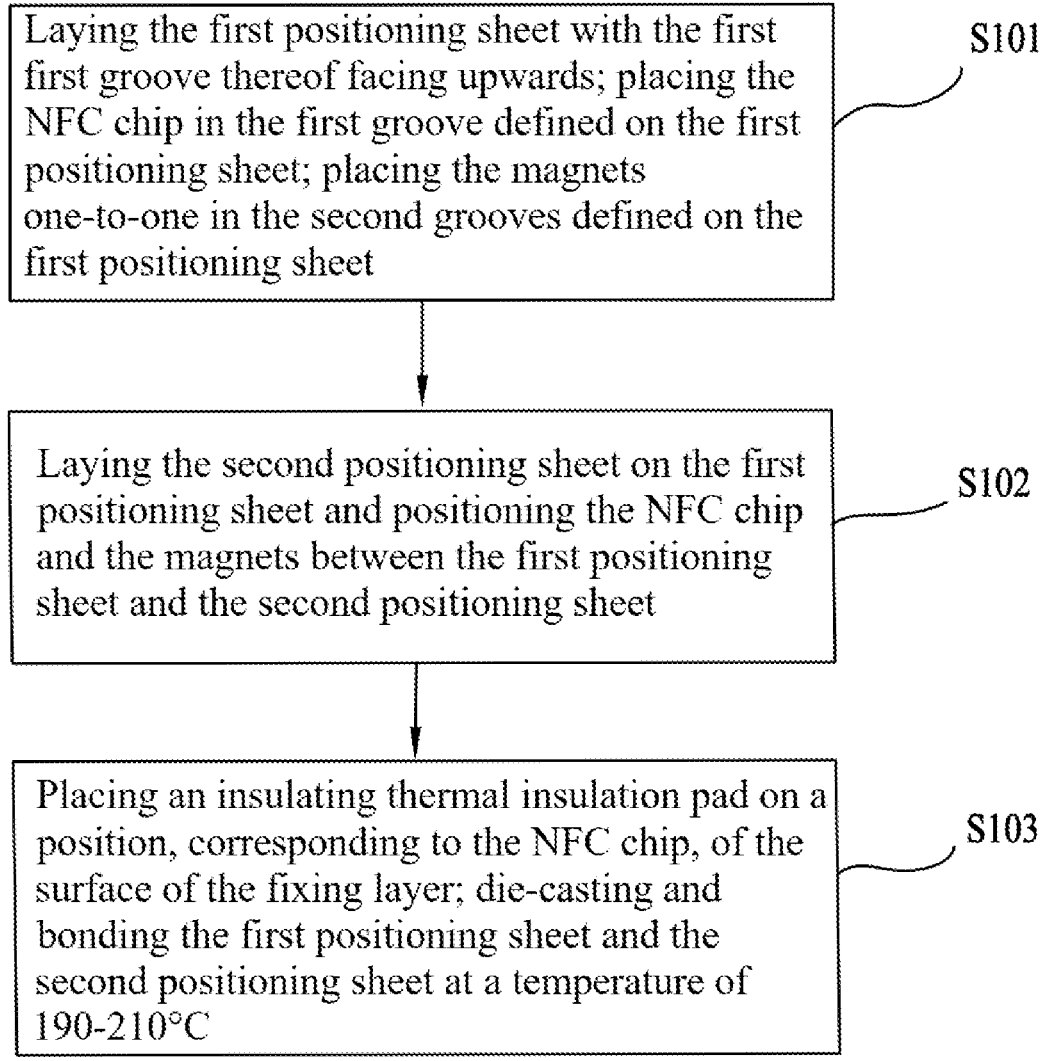
FIG. 6 is a flow chart of embedding an NFC chip between two TPU sheets

As shown in FIG. 6, when the fixing layer 1 comprises the first positioning sheet and the second positioning sheet, a step of embedding the NFC chip in the fixing layer comprises:

S101: laying the first positioning sheet 11 with the first groove 11a facing upwards; placing the NFC chip 2 in the first groove 11a defined on the first positioning sheet 11, placing the magnets 8 one-to-one in the second grooves 11b defined on the first positioning sheet 11;

S102: laying the second positioning sheet 12 on the first positioning sheet 11 and positioning the NFC chip 2 and the magnets 8 between the first positioning sheet 11 and the second positioning sheet 12; and S103: placing an insulating thermal insulation pad on a position, corresponding to the NFC chip, of the surface of the fixing layer; die-casting and bonding the first positioning sheet and the second positioning sheet at a temperature of 200° C.

In a step S102, if the first groove 11a and the second grooves 11b are also defined on the second positioning sheet 12, when laying the second positioning sheet 12, the first groove 11a and the second grooves 11b defined on the second positioning sheet 12 are placed corresponding to the first groove 11a and the second grooves 11b defined on the first positioning sheet 11.

Since the NFC chip is generally limited in heat resistance, if the first positioning sheet and the second positioning sheet are die-cast and boned at the temperature of 200° C., the NFC chip may be damaged (if the die-casting temperature is lowered considering a heat-resistant temperature of the NFC chip, a bonding effect of the TPU sheets is not good). Then if the NFC chip can only bear 120° C., by placing the insulating thermal insulation pad on the position, corresponding to the NFC chip, of the surface of the fixing layer 1, the temperature of the NFC chip is controlled within 120° C. during the die-casting and bonding process under high temperature.

S200: respectively forming the first recycled material layer 3 on the upper surface of the fixing layer 1 and the second recycled material layer 4 on the lower surface of the fixing layer 1;

Specifically, the first recycled material layer 3 and the second recycled material layer 4 are made of the recycled cloth of high density. The first recycled material layer 3 and the second recycled material layer 4 are respectively die-cast on the upper surface of the fixing layer 1 and the lower surface of the fixing layer 1 under high temperature.

S300: printing the first silicone layer 5 on a surface of the first recycled material layer 3, and printing the second silicone layer 6 on a surface of the second recycled material layer 4; and Specifically, the first silicone layer 5 and the second silicone layer 6 need to be printed and then cured and baked. A logo, text and other patterns are formed on one of the first silicone layer 5 and the second silicone layer 6 towards an outside for displaying. Since heat-resistant temperature of a silicone, material is generally of 150° C., so a curing and baking temperature of the first silicone layer 5 and the second silicone layer 6 is 90-110° C.

S400: forming a wrapping layer 7 around an outer periphery of a structure formed by the first silicone layer 5, the first recycled material layer 3, the fixing layer 1, the second recycled material layer 4, and the second silicone layer 6.

The wrapping layer 7 is made of the recycled cloth of high density and is the embroidered wrapping layer formed by the embroidered wrapping process or the glazed wrapping layer formed by the glazed wrapping process. When the glazed wrapping process is adopted, a curing and baking temperature of the wrapping layer 7 is 90-10° C.

In one specific embodiment, the smart label is a square structure of 68 mm×68 mm. The NFC chip 2 is a second generation label chip FM11NT0X1 developed by Fudan Microelectronics which complies with ISO/IEC14443-A protocol and NFC Forum Type2 label standard. The second generation label chip FM11NT0X1 has waterproof function and is a circular structure with a diameter of 12 mm. Four magnets 8 are provided, and a size of each of the magnets 8 is 10 mm×10 mm. The four magnets 8 are disposed at a distance of 5 mm from an edge of the smart label.

In the embodiment, the smart label is able to be made into a patch and the patch is able to applied to a product such as a dress, a hat, a suitcase, etc. Therefore, a second bonding portion is disposed on an outer surface of one of the first silicone layer and the second silicone layer close to the product. Specifically, the second bonding portion is disposed on the first silicone layer facing one side of the first positioning sheet defining the first groove 11a. Patterns, characters, etc., is printed on the second silicone layer opposite to the one side of the first positioning sheet 11 defining the first groove 11a.

A first bonding portion corresponding to the second bonding portion is defined on the product such as the dress and the hat. For example, the first bonding portion is defined on a chest position of an upper garment or a front position of the hat. The first bonding portion and the second bonding portion are bonded together by a hook-and-loop fastener.

Of course, the magnets may not be applied in the above embodiments. If the magnets 8 are disposed in the smart label, it is necessary to dispose magnetic portions on the first bonding portion, so that the magnetic portions are attracted to the magnets in the smart label, which improve a suction effect between the patch and the product.

For example, one side of each of the magnets facing the product is an N-pole, and then a front surface of each of the magnetic portions is an S-pole. Of course, the magnetic portions may be made of materials such as iron and nickel attracted by the magnets.

For the patch that is square, the magnets are disposed at four corners of the patch. Correspondingly, the magnetic portions on the product such as the dress or the hat are optionally one-to-one corresponding to positions of the magnets in the patch.

In this way, the patch is able to be directly torn off and is replaceable. The user can attach the patch of different patterns on the hat or the suitcase according to needs of the user. However, a conventional patch is directly sewn on the dress or the hat, so the conventional patch is hardly to take down and a selection for the patch is monotonous.

It should be noted that, considering that the smart label is generally disposed on the chest position of the dress (such as the upper garment), a heart patient who have had a bypass needs to be cautious in using the product with the smart label to avoid impact on the heart patient's heart.

The smart label based on the NFC, the hat and the manufacturing method of the smart label provided by the present disclosure are described in detail above. The description of the specific embodiments is merely used to help understand the method and the core idea of the present disclosure. It should be noted that, for those skilled in the art, improvements and modifications can be made to the present disclosure without departing from the principle of the present disclosure, and such improvements and modifications should fall within the protection scope of the claims of the present disclosure.

What is claimed is:

1. A smart label based on near field communication (NFC), comprising:
   an NFC chip,
   a fixing layer,
   a first recycled material layer,
   a second recycled material layer, and
   a wrapping layer;
   wherein the NFC chip comprises an NFC coil configured to interact with a mobile terminal and a storage module configured to store product information corresponding to the smart label; the fixing layer is configured to fix the NFC chip;
   wherein the first recycled material layer is disposed on an upper surface of the fixing layer; a first silicone layer is disposed on an upper surface of the first recycled material layer;
   wherein the second recycled material layer is disposed on a lower surface of the fixing layer; a second silicone layer is disposed on a lower surface of the second recycled material layer;
   wherein the wrapping layer is wrapped around an outer periphery of a structure; the structure is formed by the first silicone layer, the first recycled material layer, the fixing layer, the second recycled material layer, and the second silicone layer.

2. The smart label according to claim 1, wherein a first positioning sheet and a second positioning sheet are bonded together to form the fixing layer; the second positioning sheet is disposed on the first positioning sheet; the NFC chip is disposed between the first positioning sheet and the second positioning sheet.

3. The smart label according to claim 2, wherein the first positioning sheet and the second positioning sheet are thermoplastic polyurethane (TPU) sheets, the TPU sheets are bonded together by die-casting to form the fixing layer.

4. The smart label according to claim 3, wherein a middle position of one side of at least one of the first positioning sheet and the second positioning sheet defines a first groove; the first groove defined on one of the first positioning sheet and the second positioning sheet faces to the other one of the first positioning sheet and the second positioning sheet; the first groove is configured to accommodate the NFC chip.

5. The smart label according to claim 4, wherein second grooves are defined around the first groove; magnets are disposed in the second grooves; the magnets have a same magnetic pole direction.

6. The smart label according to claim 5, wherein the magnets are magnets made of a rare earth permanent magnet material.

7. The smart label according to claim 1, wherein the first recycled material layer and the second recycled material layer are made of recycled cloth; the first recycled material layer is formed on the upper surface of the fixing layer by printing, curing, and baking; the second recycled material layer is formed on the lower surface of the fixing layer by printing, curing, and baking.

8. The smart label according to claim 1, wherein the wrapping layer is an embroidered wrapping layer formed by an embroidered wrapping process or a glazed wrapping layer formed by a glazed wrapping process.

9. A hat, comprising a hat body and the smart label according to claim 1, wherein a first bonding portion is disposed on the hat; a second bonding portion is disposed on an outer surface of the first silicone layer or an outer surface of the second silicone layer; the first bonding portion and the second bonding portion are bonded together through a hook-and-loop fastener.

10. The hat according to claim 9, wherein magnetic portion are disposed on the first bonding portion.

11. A manufacturing method of a smart label based on NFC, comprising:
   S100: providing a fixing layer, and embedding the NFC chip in the fixing layer;
   S200: respectively forming a first recycled material layer on an upper surface of the fixing layer and a second recycled material layer on a lower surface of the fixing layer;
   S300; forming a first silicone layer on a surface of the first recycled material layer, and forming a second silicone layer on a surface of the second recycled material layer; and
   S400: forming a wrapping layer around an outer periphery of a structure formed by the first silicone layer, the first recycled material layer, the fixing layer, the second recycled material layer, and the second silicone layer.

12. The manufacturing method of the smart label according to claim 11, wherein in a step S100, the fixing layer comprises a first positioning sheet and a second positioning sheet; the second positioning sheet is disposed on the first positioning sheet;
   wherein a first groove is defined on a middle portion of one side of the first positioning sheet; the one side of the first positioning sheet faces to the second positioning sheet; the first grooves is configured to accommodate the NFC chip; second grooves are defined around the first groove; the second grooves are configured to accommodate magnets; or
   first grooves are respectively defined on the middle position of the one side of the first positioning sheet facing the second positioning sheet and a middle position of one side of the second positioning sheet facing the first positioning sheet; the first grooves are configured to accommodate the NFC chip; the second grooves are defined around the first grooves; the second grooves are configured to accommodate magnets;
   wherein a step of embedding the NFC chip in the fixing layer comprises:

S101: laying the first positioning sheet with the first groove thereof facing upwards; placing the NFC chip in the first one of the first grooves on the first positioning sheet; placing the magnets one-to-one in the second grooves defined on the first positioning sheet;

S102: laying the second positioning sheet on the first positioning sheet and positioning the NFC chip and the magnets between the first positioning sheet and the second positioning sheet; and S103: placing an insulating thermal insulation pad on a position, corresponding to the NFC chip, of the surface of the fixing layer; die-casting and bonding the first positioning sheet and the second positioning sheet at a temperature of 190-210° C.

13. The manufacturing method of the smart label according to claim 11, wherein in a step S300, the first silicone layer is formed on an upper surface of the first recycled material layer by a printing process and a curing and baking process; the second silicone layer is formed on a lower surface of the second recycled material layer by the printing process and the curing and baking process; a curing and baking temperature of the first silicone layer and the second silicone layer is 90-110° C.

14. The manufacturing method of the smart label according to claim 11, wherein in a step S400, the wrapping layer is formed on the outer periphery of the structure by an embroidered wrapping process or a glazed wrapping process; when the glazes wrapping process is adopted, a curing and baking temperature of the wrapping layer is 90-110° C.

\* \* \* \* \*